United States Patent [19]

Chevalier

[11] 4,270,350
[45] Jun. 2, 1981

[54] APPARATUS AND METHOD FOR CONVERTING SOLAR ENERGY

[76] Inventor: Donald M. Chevalier, 248 - 15th Ave. South, Great Falls, Mont. 59405

[21] Appl. No.: 954,364

[22] Filed: Oct. 25, 1978

[51] Int. Cl.³ .................. F01K 27/00; F01K 25/10
[52] U.S. Cl. .................. 60/516; 60/641 AC; 60/671
[58] Field of Search .......... 60/516, 641, 651, 671, 60/670, 721, 650, 682

[56] References Cited

U.S. PATENT DOCUMENTS

| | | | |
|---|---|---|---|
| 3,608,311 | 9/1971 | Roesel, Jr. | 60/721 UX |
| 3,901,033 | 8/1975 | McAlister | 60/516 |
| 3,905,195 | 9/1975 | Gregory | 60/512 |
| 3,968,652 | 7/1976 | Chevalier | 60/641 |
| 4,006,595 | 2/1977 | Forbes | 60/651 |

Primary Examiner—Allen M. Ostrager
Attorney, Agent, or Firm—Seiler and Quirk

[57] ABSTRACT

An improved apparatus for converting solar energy to mechanical and electrical energy, in which refrigerant composition is alternately evaporated and condensed in a tubing by alternate exposure to heating rays of the sun, comprises two liquid containing reservoirs communicating with the tubing, valve means for alternately directing the evaporated refrigerant composition to displace the liquid from one reservoir to the other, and a pump driven by the liquid as it passes between the reservoirs.

18 Claims, 7 Drawing Figures

APPARATUS AND METHOD FOR CONVERTING SOLAR ENERGY

BACKGROUND OF THE INVENTION

In my previous U.S. Pat. No. 3,968,652, there is disclosed an apparatus for converting solar energy to mechanical and electrical energy wherein a refrigerant composition is alternately evaporated and condensed, and in which the evaporated composition is directed through conduits to drive a turbine or hydraulic motor. A pair of coils or pipes are used for alternately being exposed to the heating rays of the sun, the non-heated coil being cooled to condense the refrigerant composition. Although such a system is useful for the intended purpose, the present invention is directed to an improved system in which even more efficient conversion of such a solar energy evaporated refrigerant composition is achieved.

SUMMARY OF THE INVENTION

The present invention is directed to an improved apparatus for converting solar energy to mechanical and electrical energy. The apparatus incorporates means for displacing liquid from one reservoir to another with evaporated refrigerant composition. This composition is alternately evaporated and condensed in sets or pairs of tubing devices, which are alternately exposed to heating rays of the sun. With one of the tubing devices so exposed, the evaporating and expanding refrigerant composition displaces liquid from one reservoir to the other, the displaced liquid being directed through a hydraulic motor, thereby driving it, to achieve mechanical energy. By the use of appropriate valves, when the liquid has been displaced from a first reservoir to fill a second reservoir, the supply of expanding gas to the first reservoir is stopped and directed to the second reservoir, so that the liquid displacement is reversed. The liquid is then displaced from the second reservoir and directed to the first reservoir, again driving the hydraulic motor. This alternating reservoir liquid displacement process is continually repeated until substantially all liquid refrigerant composition has been evaporated in one of the tubing devices which causes a drop in expansion pressure in the tubing. At that time, the pressure drop causes a pressure sensing switch to close, and a drive apparatus is energized and moves the tubing device in which the composition is evaporated, to a cooling position, and a second tubing device, having liquid refrigerant composition therein is driven to a position of exposure to the solar heating rays. More specific details of the apparatus, the method of its use, and other embodiments thereof will be disclosed in the following detailed description.

DETAILED DESCRIPTION OF THE INVENTION

Figure 1:
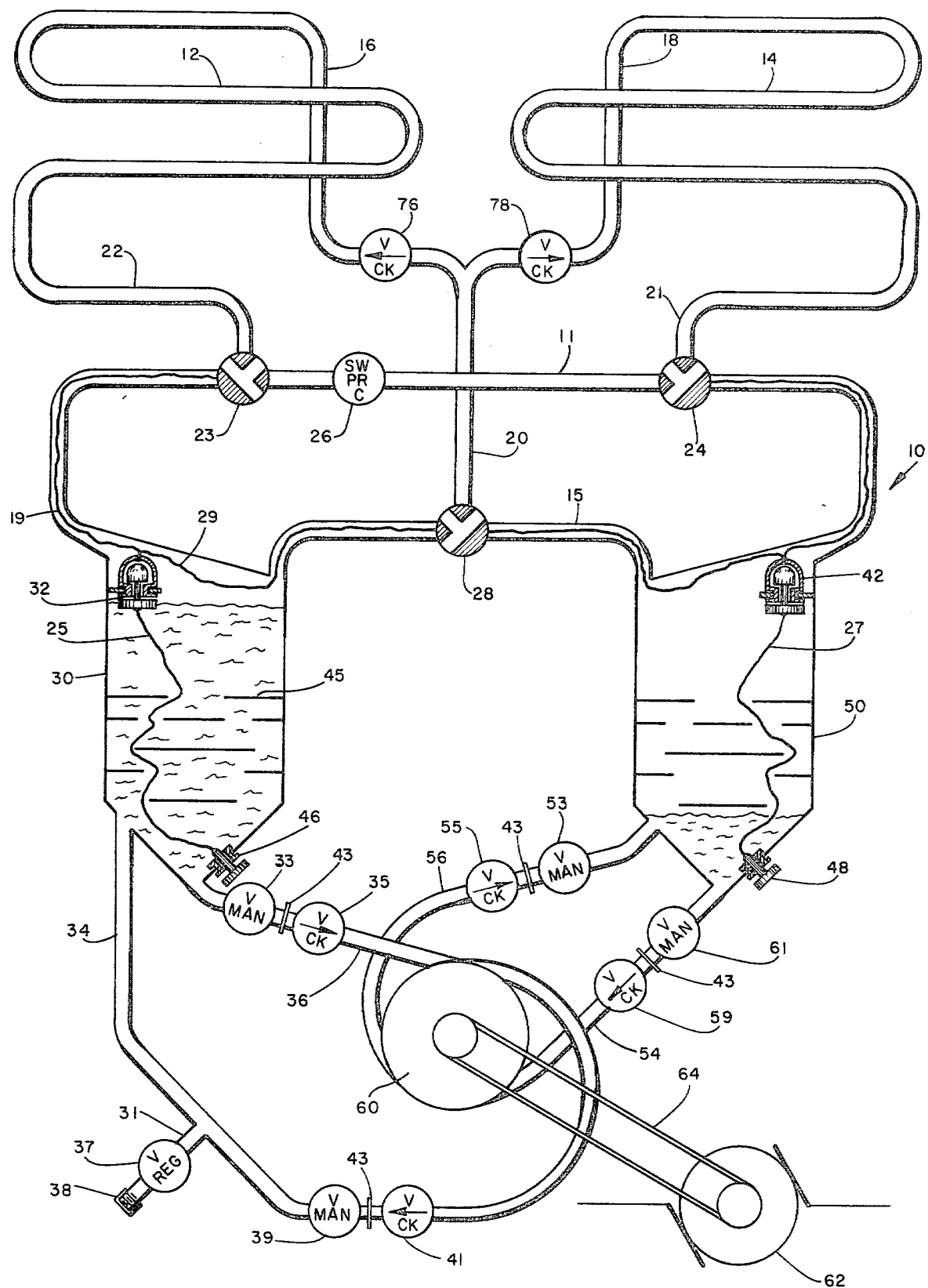
FIG. 1 is a schematic view illustrating components of the apparatus of the invention.

In FIG. 1 there is shown a schematic view of an apparatus incorporating characteristics of the invention. Two units of tubing, 12 and 14, respectively, contain refrigerant composition, which is alternately evaporated and condensed to convert solar energy to mechanical and electrical energy according to the invention. The respective tubing devices are alternately exposed to heating rays of the sun in an apparatus similar to that shown and disclosed in my aforesaid U.S. patent. Such an apparatus includes reflector panels for focusing rays of the sun onto the tubing. Only one of the tubing members is exposed to the sun's rays at a time, while the other tubing member is being cooled by a fan, or preferably by spraying, immersing or otherwise exposing the tubing to cool water, which water then becomes heated and is stored for nighttime evaporation of refrigerant composition, or otherwise utilized. Again, such apparatus features and functions are disclosed in my aforesaid U.S. patent, and the pertinent portions thereof are incorporated herein by reference.

The present invention is directed particularly to the method of utilizing the expanding gas from the heated refrigerant composition in an exposed tubing member. In FIG. 1, as tubing member 12 is exposed to the heating rays of the sun in such a reflective panel apparatus, refrigerant composition therein is evaporated. As this occurs, the gas expands into first tubing inlet 22, and first inlet valve 23 directs the gas into first reservoir 30. Gas inlet conduit 11 communicates with both first reservoir 30 and second reservoir 50, and as first inlet valve 23 is open for direction of the gas into the first reservoir, second inlet valve 24 is closed, so that gas cannot enter the second reservoir. A suitable amount of liquid, preferably water, or some other fluid which will not react or be miscible with the refrigerants, or otherwise become deteriorated, by exposure to the refrigerant composition gas, is received in the two reservoir system. Preferably the fluid is heavier or has a greater specific gravity than the refrigerant composition. The amount of fluid should be such that when one of the reservoirs is substantially filled, the other reservoir is substantially empty, and so that the fluid in one reservoir may be displaced to fill the other reservoir, without overflowing.

In order to utilize the work accomplished as liquid is displaced from one reservoir to the other, the apparatus is provided with a hydraulic motor 60, driven by the displaced liquid. In the preferred embodiment shown, a first conduit 36 communicates between first reservoir 30 and hydraulic motor 60. A second conduit 34 also communicates between the pump and the first reservoir. Third and fourth conduits 54 and 56 communicate between the pump and second reservoir 50. Associated with each of the four conduits are manual shutoff valves and one way check valves. Accordingly, manual shut off valves 33, 39, 53 and 61 are conveiently located in the respective conduits for shutting off any flow of liquid from the two reservoirs. Associated with each of the shut off valves are unions 43. The conduits can be disconnected at the unions for removing the hydraulic motor for repair or replacement. Thus, the manual shut off valves and the unions in each of the four conduits provide a most efficient and convenient way of removing and replacing the hydraulic motor. Preferably, in each of the conduits is also located a one-way check valve, valves 35, 41, 55 and 59 being shown. These check valves can be placed in the respective conduits at any convenient location along the line, their purpose being for limiting the flow of liquid in the required direction for operation of the apparatus, and preventing any back surge or leaking of the liquid in the conduit in the wrong direction, since it would interfere with and significantly reduce the efficiency and operation of the apparatus for the intended purpose.

Also preferably associated with the conduit system is a valve 37 in a nipple 31 at a convenient place in the conduit system and a cap 38, which threadedly engages the end of the nipple. When replenishment of liquid is needed in the system, where liquid has been lost through evaporation or leakage, cap 38 can be removed, and liquid introduced through the nipple. Similarly, where too much liquid has been initially placed in the system, some can be bled off by removing the cap, valve 37 being of assistance so that the amount of fluid drained or introduced can be more easily and precisely metered. A window or other means for visibly checking fluid level in the reservoirs may also be incorporated.

Figure 4:
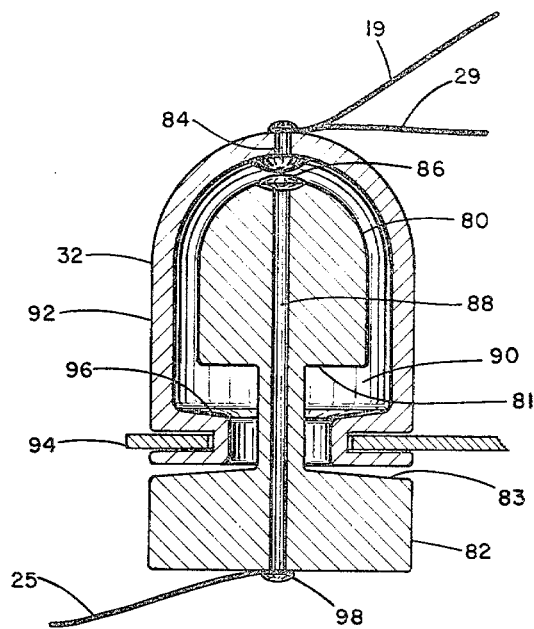
FIG. 4 is a sectional view of a preferred float switching device incorporated in the apparatus.

Also associated with the apparatus are means for reversing the direction of gas introduction into the reservoirs, more specifically, for changing the evaporating refrigerant composition flow from one reservoir to the other as liquid has been fully displaced from one to the other. To accomplish this, a convenient means incorporates devices for detecting such liquid displacement when one or the other of the reservoirs have been completely filled with such displaced liquid. For this purpose, first and second float switches 32 and 42 are located in first and second reservoirs 30 and 50, respectively. Such float switches are more fully shown and described in FIG. 4, and include a float member 82 disposed in a housing shell 92, in which shell is defined a chamber 90 in which an upper portion 80 of the float member is received. Because the chamber is enlarged somewhat relative to the size of upper float portion 80, the float is free to move within the chamber. Secured on the upper end of shell housing 92 is an electrical contact 84. Float member 82 contains a wire or other electrical conduit 88 extending between an electrical contact 86, located on top of upper float portion 80 and insulated electrical connection 98, at the lower end of the float. Insulated wires 25 and 27 extend from float switches 32 and 42 to electrical connectors 46 and 48, respectively as shown in FIG. 1. To these connectors are supplied wires communicating with an electrical source, so that when one of the electrical float switches is closed, energy can be supplied therethrough to a means for operating valves 23, 24 and 28, such as solenoids, etc.

The float switches work through the action of a float 82. When the liquid level in either of the reservoirs is below a certain level, normally the filled level of a reservoir, the float will drop within the shell housing 92, and electrical contacts 84 and 86 will be separated and the switch open. The shell housing is maintained in a stationary position by suitable clamping means, such as being fitted on a holder 94 or similar means conveniently installed within the reservoirs. As the water level drops within a reservoir, float member 82 will be lowered until lower surface 81 comes to rest on shoulder 96. As water is forced into a reservoir, the liquid level will rise, and cause float member 82 to be lifted until electrical contacts 84 and 86 meet, at which time the switch will be closed. Such a float design avoids fouling of the electrical contacts by refrigerant composition or liquid. As the electrical contacts meet, electricity is supplied through the switch via wires 19 and 29 to respective solenoid operated valves 23 and 28. Float switch 42 is provided with corresponding wires for actuating valves 24 and 28. A plurality of baffles, in the form of plates 45, which may be perforated, may also be installed in the reservoirs. Such baffles will reduce splashing of fluid or surging, within the reservoirs, which could cause premature activation of the float switches.

In operation of the apparatus shown, with the given condition that first tubing member 12 is exposed to the sun's heating rays, and with that tubing charged with a substantial amount of refrigerant composition, with valve 23 open and valve 24 closed, the expanding gas is directed into first reservoir 30. Gas outlet valve 28, also electrically operated, is open so that gas displaced from reservoir 50 is directed via gas outlet conduits 15 and 20, through check valve 78, gas return conduit 18 and into second tubing member 14, which is being cooled. The displaced gas will not enter gas return conduit 16 to first tubing member 12 because of the pressure of expanding gas in those components beyond check valve 76. At the same time, second tubing member 14 is being cooled, and as refrigerant composition is condensed therein, a vacuum is created. Again, with valve 28 open, this low pressure condition above the liquid level in reservoir 50 assists in drawing displaced gas from the reservoir into the second tubing member.

As heated and expanding refrigerant composition is directed into first reservoir 30, the liquid is forced out and passes through one way check valve 35, through conduit 36 against vanes or other drive members of hydraulic motor 60, into conduit 56, check valve 55, and finally into second reservoir 50. At this fluid displacement continues, hydrauic motor 60 is driven. As the liquid level in second reservoir 50 continues to rise and meets the float member of switch 42, the rising float member will cause contacts 84 and 86 to meet, thereby closing the switch. At this occurs, electricity is supplied via connector 48, wire 27, switch 42, and electrical connectors extending therefrom to operating means for valves 23, 24 and 28, those valves will be switched. Thus, when the rising liquid level in reservoir 50 closes float switch 42, valve 24 opens, valve 23 closes, and valve 28 is switched to be closed to reservoir 50 and open to reservoir 30. The expanding refrigerant composition gas from first tubing member 12 will now be directed through gas inlet conduit 11 to second reservoir 50, to displace the liquid therein to first reservoir 30. At the same time, gas displaced from first reservoir 30 will be directed via gas return conduits 20 and 18 into the second tubing member 14, being cooled as previously noted. Liquid from second reservoir 50 is then displaced by the expanding gas and directed via conduit 54 through hydraulic motor 60, thereby driving the hydraulic motor, through conduit 34 and returned to first reservoir 30. This alternating displacement of liquid between the two reservoirs continues, with hydraulic motor 60 being driven. A pulley 64 or other convenient means such as a belt or chain may be connected to the hydraulic motor drive shaft for operating a generator 62, or the like. However, this is only example, by way of illustration only, to show the use of such liquid displacement to convert the solar energy, and other equivalent means may also be used.

The first tubing member 12 will remain exposed to the heating sun rays until the refrigerant composition therein has become substantially evaporated. Normally, so long as the evaporation continues, the gas expansion and pressure will continue thereby yielding continuous liquid displacement in the reservoirs. However, after much of the liquid refrigerant composition has been evaporated, gas pressure drop in the first tubing member will be sensed by pressure monitor and control switch 26. At some critical low gas pressure, for example, occuring when substantially all of the refrigerant composition in the first tubing member has evaporated or expanded, switch 26 will close, which switch is electrically connected to drive means for moving second tubing member 14 into position for exposure to heating sun rays and concomitant movement of first tubing member 12 to a cooling position. As this occurs, second tubing inlet 21 communicates with gas inlet conduit 11 via valve 24 whereby it directs expanding evaporated refrigerant composition in a manner as previously described. Concomitantly, as first tubing member 12 is cooled, it will create a vacuum as refrigerant composition condenses therein, for drawing displaced gas alternately from the reservoirs in a process as previously described. Again, check valves 76 and 78 prevent backflow of the gas from either of the tubing members into gas outlet conduit 20, so that effectively, these conduits are one way conduits for displaced gas. Alternative to movement of the tubing members, the apparatus may have means for moving the reflective panel assembly alternately over the tubing members.

Figure 2:
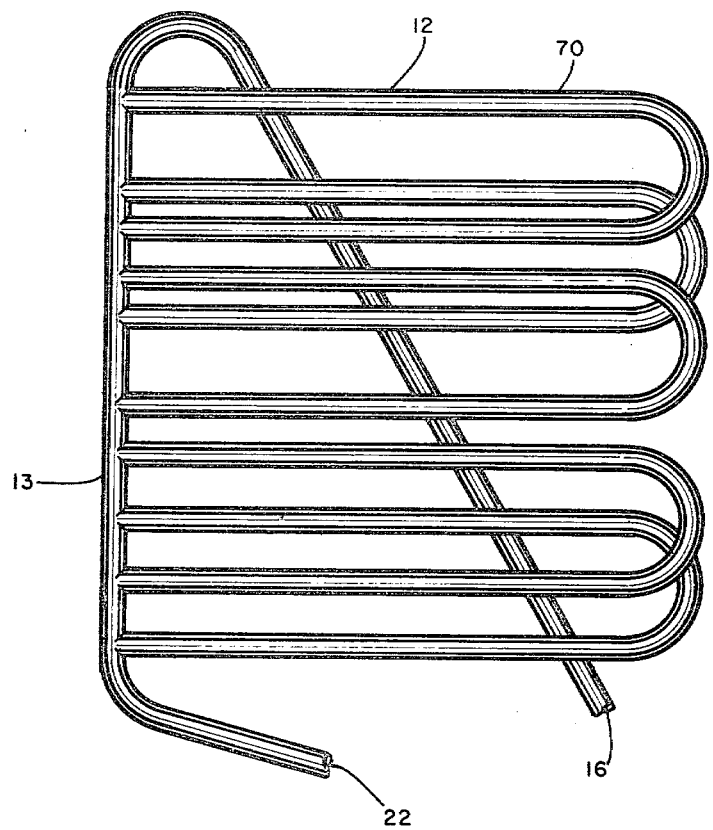
FIG. 2 is a view showing a tubing device embodiment.
Figure 3:
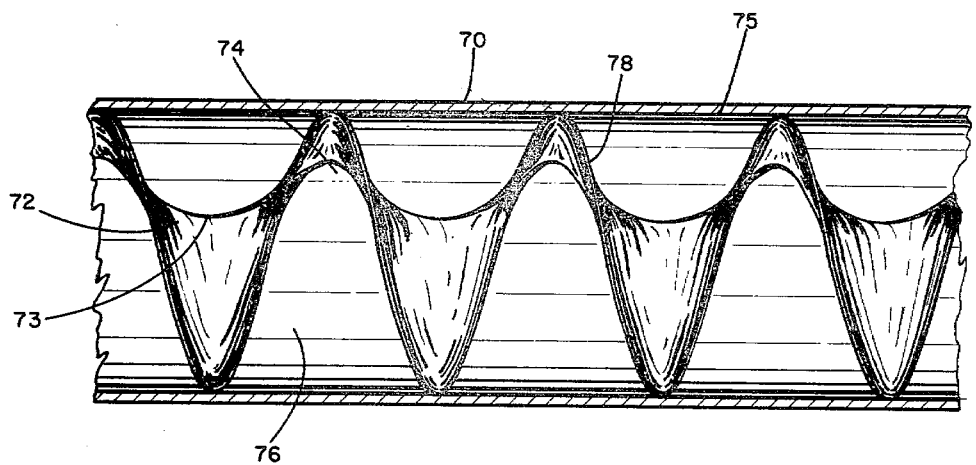
FIG. 3 is a cutaway view illustrating a helical coil structure interiorally of the pipe, in which refrigerant composition is alternately evaporated and condensed.

In FIGS. 2 and 3 the tubing is shown in greater detail. In FIG. 2, one tubing member 12 is shown having a plurality of tube portions 70, each having two ends connected to manifold pipe 13 which is an extension of tubing inlet 22. The number of tubing portions 70 is not necessarily critical, so long as a sufficient tubing surface area is exposed to yield a desirable amount of refrigerant composition gas evaporated during the exposure. Thus, as a practical matter any tubing length may be used, the practical limits being the size of the apparatus desired and its capacity. Extending from, and communicating with one end of tubing manifold pipe 13 is first tubing inlet 22, and at the other end, gas return conduit 16. The shape of the tubing member portions 70 is not critical, and any desirable configuration may be used, although the U-shape shown will normally be preferred, because of relative simplicity and effectiveness to achieve the desired purpose.

In FIG. 3, there is illustrated a preferred tubing interior. A section of the length of tubing portion 70 has been cut away to expose the interior thereof. A coil 72 extends along the length on each tubing portion 70, which coil is helical, having an auger-like shape, with an offset channel 74 extending along the coil. This channel is thus defined along an inner helical coil surface 73, which the outer coil surface 78 lies against the inner tubing wall 75. Thus, there is formed an effective seal between the outer coil surface and inner tubing wall whereby a plurality of pockets or spaces 76 are formed, and in which the refrigerant composition is received along each tubing portion. This feature also allows the liquid refrigerant composition to be separated into small pool which improves the evaporation efficiency and rate. With the channels 74 being offset upwardly from the elongated coil axis, the distance between the channel and the bottom of the interior tubing wall will be deeper than the distance between the central coil axis and the interior wall, thereby offering a deeper pocket for refrigerant composition. Such a feature allows for more liquid refrigerant composition to be placed in the tubing. Another advantage of such a coil it that it provides significantly increased strength to the tubing. Because of such an improved strength, the material and strength characteristics of the tubing exterior composition is not nearly so critical, and relatively lightweight materials such as aluminum, or other lightweight alloy compositions may be used, notwithstanding strength properties that they might have.

Figure 5:
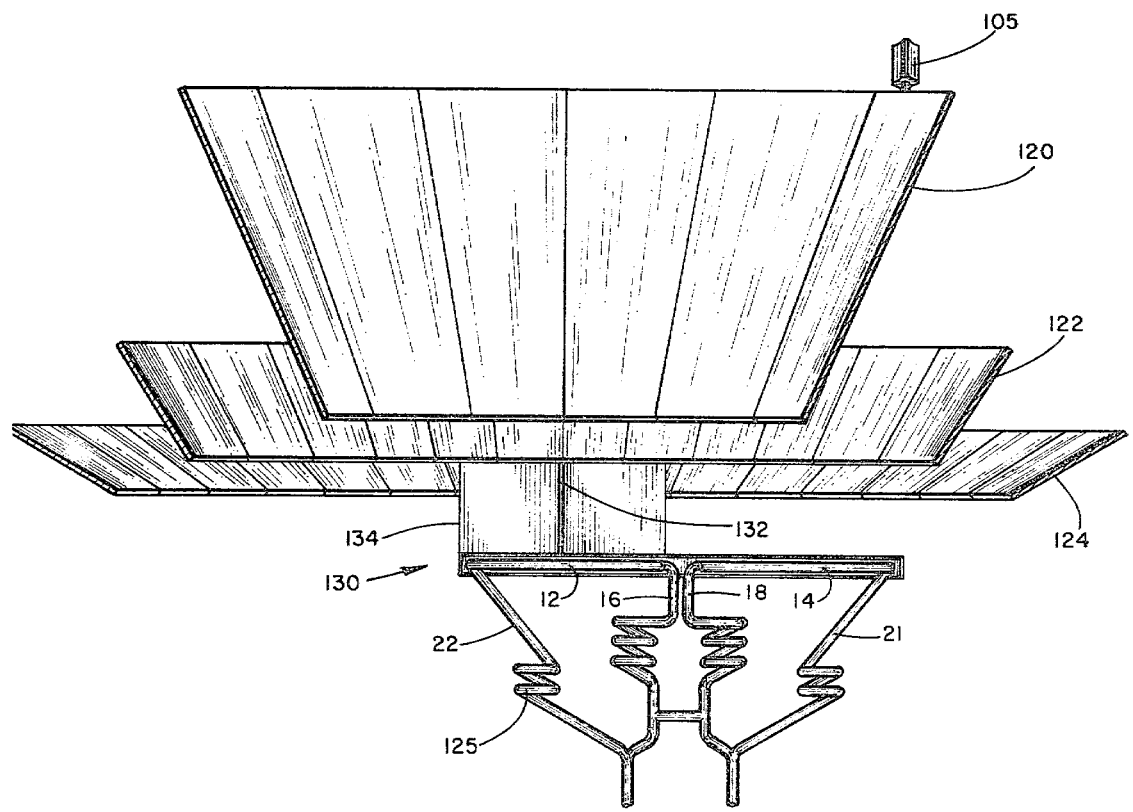
FIG. 5 is a side elevational view illustrating reflector panels and furnace assembly.

FIG. 5 illustrates a preferred reflector assembly which may be used for heating the tubing as previously described. Three reflector panel levels 120, 122 and 124 are shown comprising a plurality of individual panels, each of which is exposed and positioned to the sun and the furnace assembly 130 to give optimum energy directed to the furnace. Any number of panels may be used, as may other reflector panel assembly designs. The furnace assembly 130 houses the tubing unit 12 being heated, the other tubing components also being shown to correspond with FIG. 1. Flexible coil sections 125 are used between the stationary reservoir assembly and the reflector and furnace assembly, since the latter is preferably movable so that the panels are maintained in a position to follow the sun's movement during the day for continuous focus on the furnace.

Figure 6:
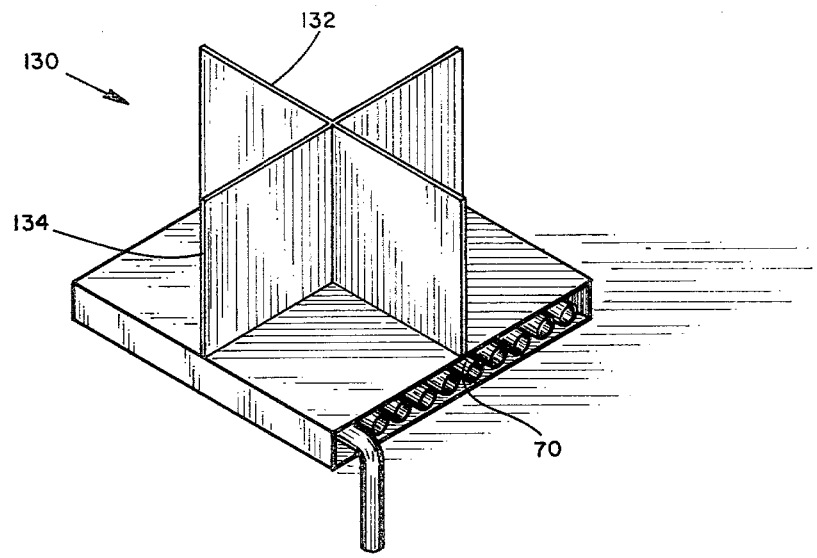
FIG. 6 is a perspective view of preferred furnace mirror panels.

FIG. 6 shows a preferred furnace assembly 130 using crossed mirror panels 132 and 134. Such panels located on top of the furnace under which the tubing being heated is located, provides more effective heat absorbing characteristics to the furnace, thereby further improving efficiency of the apparatus.

Figure 7:
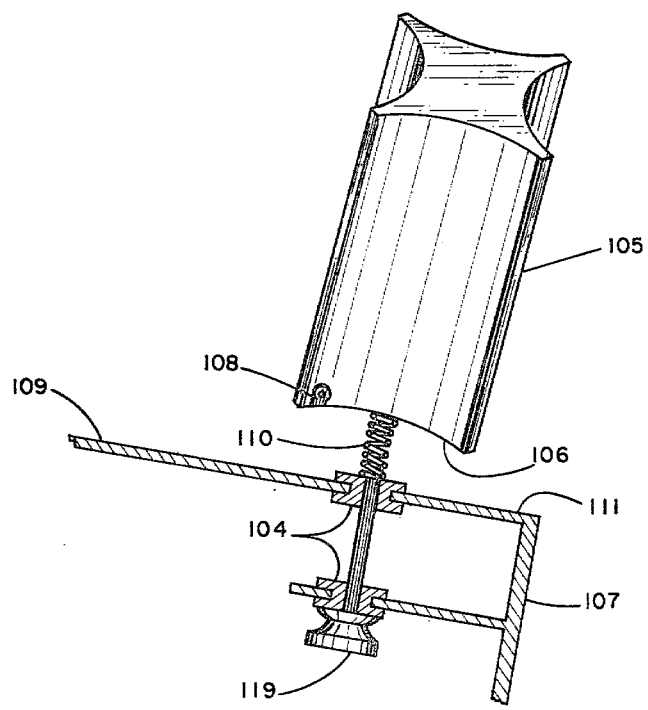
FIG. 7 illustrates a leveling device which may be used in conjunction with the apparatus.

In FIG. 7, there is shown a leveling device for preventing damage to the reflective panel and tubing apparatus during relatively high winds. The device includes a vane member 105 secured on a spring 110 and support frame 107. An electrically conductive plate 106 is secured to the bottom of vane member 105 and contact arms 109 and 111, also electrically conductive are wired to an electrical source, as is electrical connection 108. The device is attached to the panel apparatus at base 119 at any convenient location, so long as it is exposed to wind from any direction. In operation, as wind forces against the vane member, it will be tipped on spring 110. When the wind is sufficiently strong to tip the vane to a position where plate 106 meets contact arm 109 or 111, an electrical switch is closed, thereby actuating drive means for moving or tilting the panel assembly to a position where it will be less vulnerable to the wind.

Any suitable refrigerant composition may be used such as fluorocarbons, many of which are commercially available under the trademark Freon. The liquid displaced in the reservoirs is preferably water, although other liquid compositions may be used, so long as they do not react with or become deteriorated by the refrigerant composition. An important property of the liquid is to form a wetting seal along the reservoir interior to prevent the refrigerant gas from entering the fluid conduits and passing between the reservoir, which would affect the systems efficiency. To assist in the liquid wetting properties, a small amount of surface active agent or mixtures thereof may be added to the water. Other modifications to the apparatus and process of energy conversion within the purview of the invention will be evident to those skilled in the art.

I claim:

1. In an apparatus for converting solar energy to mechanical energy including first and second tubing members in which a refrigerant composition is alternately vaporized and condensed by alternate exposure of said tubing members to the sun's heating rays, the improvement comprising:
   (a) first and second liquid containing reservoirs,
   (b) a hydraulic motor driven by liquid passing between said first and second reservoirs,
   (c) liquid conduit members extending between each of said reservoirs and said hydraulic motor for directing liquid therethrough,
   (d) gas conduit members extending between each of said first and second tubing members and said first and second reservoirs for directing gas therebetween, and
   (e) valve means cooperating with said gas conduit members for limiting the flow of gas to one of said reservoirs from one of said tubing members at a time.

2. The apparatus of claim 1 including switching means for operating said valve means comprising a first switch cooperating with said first reservoir and a second switch cooperating with said second reservoir, which switching means are responsive to the liquid levels in each of said reservoirs.

3. The apparatus of claim 2 wherein said second switch actuates said gas valve means to direct gas from one of said tubing members to said second reservoir when said second reservoir is filled with liquid to a predetermined level, and said first switch actuates said gas valve means to direct gas from one of said tubing members to said first reservoir when said first reservoir is filled with liquid to a predetermined level.

4. The apparatus of claim 3 including means for detecting pressure drop in each of said tubing members, drive means for moving said first and second tubing members for said alternate exposure thereof, and third switching means responsive to said pressure detecting means for actuating said drive means.

5. The apparatus of claim 3 wherein said liquid conduit members include first and second liquid conduits extending between said first reservoir and said hydraulic motor, for directing liqud from said first reservoir to said hydraulic motor, and from said hydraulic motor to said first reservoir, respectively, and third and fourth liquid conduits extending between said second reservoir and said hydraulic motor, for directing liquid from said second reservoir to said hydraulic motor, and from said hydraulic motor to said second reservoir, respectively.

6. The apparatus of claim 5 including one-way check valves cooperating with said conduits.

7. The apparatus of claim 3 including interior baffle means in said reservoirs.

8. The apparatus of claim 1 wherein said tubing members comprise a length of tubing having therein a helical coil having an outer coil surface laying against the interior tubing surface substantially along the entire length thereof.

9. The apparatus of claim 8 wherein said coil has an inner coil surface defining a channel along said tubing interior, which channel is offset relative to the interior axis of said tubing.

10. The apparatus of claim 1 or 3 including a liquid in at least one of said first and second reservoirs for being displaced therebetween by said vaporized refrigerant composition, said liquid forming a wetting seal along the reservoir interior.

11. The apparatus of claim 1 or 3 including a liquid in at least one of said first and second reservoirs for being displaced therebetween by said vaporized refrigerant composition, said liquid forming a wetting seal along the reservoir interior, and wherein said liquid has a greater specific gravity than said refrigerant composition.

12. The apparatus of claim 1 or 3 including water in at least one of said first and second reservoirs for being displaced therebetween by said vaporized refrigerant composition, and wherein said refrigerant composition comprises a fluorocarbon.

13. In a method of converting solar energy to mechanical energy in which a refrigerant composition is vaporized by being heated, the improvement comprising
   alternately exposing first and second pipe members containing refrigerant composition therein to solar energy to vaporize said refrigerant composition,
   directing the vaporized refrigerant composition from the exposed pipe member alternately to first and second liquid containing reservoirs whereby the liquid from one of said reservoirs is displaced by said composition and directed to the other of said reservoirs, and
   driving a hydraulic motor by passing said displaced liquid therethrough between said reservoirs.

14. The method of claim 13 including switching the vaporized refrigerant composition direction from said first reservoir to said second reservoir when said second reservoir is filled with said displaced liquid to the desired extent, and vice versa.

15. The method of claim 13 including alternately cooling each of said pipe members sufficiently to condense a substantial amount of vaporized refrigerant composition, said cooling of each respective pipe member being carried out while the other of said pipe members is being exposed to said solar energy.

16. The method of claim 15 wherein said cooling is accomplished by exposing said pipe members to cold water, whereby said water becomes heated, and storing said heated water.

17. The method of claim 16 including vaporizing refrigerant composition by exposing said pipe members alternately, to said heated water.

18. The method of claim 13 wherein the liquid has a greater specific gravity than said refrigerant composition and forms a wetting seal along the reservoir interior.

* * * * *